(12) United States Patent
Lang et al.

(10) Patent No.: US 10,798,275 B2
(45) Date of Patent: Oct. 6, 2020

(54) HOLDING APPARATUS FOR A VEHICLE

(71) Applicant: MEKRA LANG GMBH & CO. KG, Ergersheim (DE)

(72) Inventors: Werner Lang, Ergersheim (DE); Alexander Wotschal, Bad Windsheim (DE); Stefan Centmayer, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 29 days.

(21) Appl. No.: 16/170,899

(22) Filed: Oct. 25, 2018

(65) Prior Publication Data

US 2019/0132497 A1    May 2, 2019

(30) Foreign Application Priority Data

Oct. 26, 2017  (DE) .......................... 10 2017 125 101

(51) Int. Cl.
| | |
|---|---|
| *B60R 11/04* | (2006.01) |
| *H04N 5/225* | (2006.01) |
| *B60R 1/076* | (2006.01) |
| *B60R 1/00* | (2006.01) |
| *B60R 11/00* | (2006.01) |

(52) U.S. Cl.
CPC ............. *H04N 5/2253* (2013.01); *B60R 1/00* (2013.01); *B60R 1/076* (2013.01); *B60R 11/04* (2013.01); *H04N 5/22525* (2018.08); *B60R 2011/004* (2013.01); *B60R 2011/0082* (2013.01); *B60R 2300/8046* (2013.01)

(58) Field of Classification Search
CPC .... H04N 5/2253; H04N 5/22525; B60R 1/00; B60R 1/076; B60R 11/04; B60R 2011/004; B60R 2011/0082; B60R 2300/8046

See application file for complete search history.

(56) References Cited

U.S. PATENT DOCUMENTS

| | | | |
|---|---|---|---|
| 9,667,922 B2 | 5/2017 | Lang et al. | |
| 2004/0246608 A1 | 12/2004 | Wellington et al. | |
| 2013/0128039 A1* | 5/2013 | Meier | ..................... B60R 11/04 348/143 |
| 2015/0097955 A1* | 4/2015 | De Wind | ................ B60R 1/062 348/148 |

(Continued)

FOREIGN PATENT DOCUMENTS

| | | |
|---|---|---|
| DE | 102010005638 | 7/2011 |
| DE | 10 2012 003 561 | 8/2013 |

(Continued)

*Primary Examiner* — John R Schnurr (74) *Attorney, Agent, or Firm* — Cozen O'Connor (57) ABSTRACT

A holding apparatus (50) for a vehicle has a first element (51) attachable to the vehicle (1), a second element (52) movably connected with the first element (51) via a bearing mechanism, an image capture unit (10, 10A, 10B) attached to the second element (52) and configured to capture a capture area around the vehicle (1), and a signal unit (20) configured to detect the position of the first element (51) relative to the second element (52). The signal unit (20) has a signal device (22) adapted to output a signal (S) and a signal transmitter (21) configured to operate the signal device (22) dependent on a position of the first element (51) to the second element (52) such that it outputs a signal (S).

22 Claims, 7 Drawing Sheets

(56) References Cited

U.S. PATENT DOCUMENTS

| | | | | |
|---|---|---|---|---|
| 2015/0183371 | A1* | 7/2015 | Okada | B60R 1/00 348/148 |
| 2016/0185297 | A1* | 6/2016 | Boehm | B60R 1/08 348/148 |
| 2017/0026568 | A1 | 1/2017 | Haehnichen | |
| 2017/0136951 | A1 | 5/2017 | Wieczorek et al. | |
| 2019/0039531 | A1* | 2/2019 | Wilson | B60S 1/528 |

FOREIGN PATENT DOCUMENTS

| | | |
|---|---|---|
| DE | 10 2012 015 395 | 11/2013 |
| DE | 102013217081 | 3/2015 |
| DE | 10 2014 006 961 | 11/2015 |
| DE | 202015106118 | 11/2015 |
| DE | 10 2014 111 068 | 2/2016 |
| DE | 102016102508 | 8/2017 |
| DE | 102017112062 | 12/2018 |
| EP | 3178701 | 6/2017 |
| EP | 3409540 | 12/2018 |
| EP | 3466765 | 4/2019 |
| JP | H 06-000953 U | 1/1994 |
| JP | H 09-175272 | 7/1997 |
| JP | 2013-241107 | 12/2013 |
| JP | 2014-151911 | 8/2014 |
| JP | 2006-113054 | 6/2016 |
| JP | 2016-113054 | 6/2016 |
| WO | WO 00/47447 | 8/2000 |
| WO | WO 03/037681 | 5/2003 |
| WO | WO 2015/062602 | 5/2015 |
| WO | WO 2017/178859 | 10/2017 |

* cited by examiner

HOLDING APPARATUS FOR A VEHICLE

BACKGROUND OF THE INVENTION

1. Field of the Invention

The present invention relates to a holding apparatus for a vehicle, in particular a holding apparatus for a camera for use at commercial vehicles, and a camera monitor system with such a holding apparatus.

2. Description of the Related Art

With respect to automobiles, so-called fields of view are legally prescribed dependent on the type of the automobile, such as motorcycles, vehicles for passenger transport, vehicles for transport of goods, etc., which fields of view have to be depicted by a device for indirect view and which fields of view have to be visible at any time for a driver sitting on a driver's seat by means of the device for indirect view. Usually, the devices for indirect view are constituted by mirrors.

In recent times, such devices for indirect view are more and more replaced and/or added by cameras and image capture units, respectively, which are configured such that a camera attached to the outside of the vehicle captures an image of the environment of the vehicle and the image, if applicable after image processing, is depicted visibly for the driver on a reproduction device attached to the interior of the vehicle.

At present, such cameras and image capture units, respectively, are usually directly mounted fixedly or detachably on the vehicle body, that is, they hardly protrude far from the vehicle body. If a camera is attached to the vehicle in such a manner, however, it is hardly possible to capture sideward areas of view next to the vehicle having similar angles of view which would be available to the driver viewing in a common side mirror without using image capture units with a comparatively large wide angle. However, just in the field of commercial vehicles, it is desirable to make an even and horizontal portion of the lane with a predetermined width which portion extends with a predetermined distance behind the eye point of the driver up to the horizon viewable on each of the driver's side and the passenger's side. If common mirrors are used, the width of this stripe corresponds to the field of view of a wide angle mirror in a predetermined distance behind the eye points of the driver (for instance, field of view IV as defined in the Economic Commission for Europe Rule 46 "ECE R46"), to the field of view of a main mirror in a short distance behind the eye points of the driver (for instance, field of view II as defined in the ECE R46), whose predetermined viewable width, i.e. the extension in vehicle lateral direction, is smaller than the width of the wide angle mirror. It is difficult to display such areas of view with camera systems which are directly attached to the vehicle.

Further, although the replacement of common mirrors by camera systems is favorable from a fluidic point of view and has an advantageous effect on the fuel consumption, because the circulation of the vehicle is not negatively influenced by projecting or sticking out mirrors. However, in recent times, mirrors are specifically designed for effecting particular flow conditions which have an advantageous effect on the fuel consumption. With a mirror replacement system which is directly attached to the vehicle body, the possibility of these specific circulation influences around the vehicle falls away.

On the other side, with providing sticking out attachments for a camera monitor system of a vehicle which captures the camera and in particular its image capture unit for achieving an optimal view and orientation of the camera, it is desirable, if so, that these are to be attached at a location at the vehicle which is not or only poorly visible by a driver sitting on the driver's seat. This means that the attachment of the image capture unit, if so, is not or only poorly visible by a driver during particular driving maneuvers and, thus, in particular in the case if the attachment location of the camera sticks widely from the vehicle and, accordingly, is not congruent with the common contours of the vehicle, has the risk of a collision with the environment or other road users.

Consequently, patent DE 10 2012 015 395 B3 suggests a camera arm for a mirror replacement system camera of a vehicle which comprises a first housing element and a second housing element. The first housing element houses an image capture unit of the mirror replacement system camera and the second housing element is configured to be connected fixedly with the vehicle body. A rotating mechanism is provided between the first housing element and the second housing element such that the first housing element is rotatable relative to the second housing element around a rotating axis A. So, the camera arm of DE 10 2012 015 395 B3 provides the possibility to position the camera relative to the vehicle such that the desired viewable areas may be reliably captured by the image capture unit and to protect the camera in case of collisions of the camera arm with an obstacle in the vehicle environment by retracting.

However, there might be the case, in particular with such multi-part camera arms, that the camera—e.g. by collision of the camera arm with an object in the vehicle environment or by third party interaction (displacement of the camera arm by a third party)—is positioned relative to the vehicle such that one or more fixedly defined capture areas (such as the mentioned legally prescribed fields of view II and IV or one or more individual defined areas of view) are no longer shown completely. If this concerns merely a small deviation between the capture areas to be shown and the actual shown capture areas, there might be the case that the driver, in particular if the driver is not familiar with the vehicle, does not recognize this deviation. Thus, he might recognize possible risky situations which are captured only poorly or are not captured at all due to the deviation between the capture areas to be shown and the actual shown capture areas, to late or not at all which results in an increased collision risk of the vehicle with other road users or objects in the vehicle environment.

A retractable exterior rearview mirror is further known from WO 00/47447 A1. DE 10 2012 003 561 A1 and DE 10 2014 111 068 A1 disclose retractable exterior rearview mirrors each with a camera. DE 10 2014 006 961 A1 discloses a pull-in camera replacing an exterior rearview mirror.

SUMMARY OF THE INVENTION

In this respect, it is an object of the invention to provide a holding apparatus for a mirror replacement system camera of a vehicle which allows the vehicle driver to identify a deviation between a fixedly defined capture area which is to be shown and an actual shown capture area.

This object is solved with a holding apparatus for a camera for use in a vehicle, in particular a commercial vehicle, with the features of claim 1 and a camera monitor system according to claim 24. Preferred embodiments are given in den dependent claims.

The invention is based on the idea to provide a holding apparatus for an image capture unit, in particular a camera for use in a vehicle, which allows monitoring with respect to whether the holding apparatus is in an operating position or not. In this respect, the holding apparatus comprises a first and a second element which are movable relatively to each other, wherein the first element is fixedly attachable to the vehicle. In the operating position, the first and the second element preferably form an elongated camera arm which projects far from the fixing position at the vehicle, wherein the image capture unit is preferably arranged in its vehicle-distal end. The image capture unit is fixedly provided at the second element as concerns the location and the position. Thereby, the operating position is a position of the holding apparatus, in particular the first element relative to the second element, which allows capturing of a fixedly defined capture area of the image capture unit, in particular the camera. The fixedly defined capture area may be an individually determined capture area or may correspond to (legally) prescribed capture areas, such as fields of view, as defined in the ECE R46 (e.g. the fields of view II and IV). In order to show the driver that a fixedly defined capture area is shown or is not shown to him, the operating position of the holding apparatus, that means in particular the first element relative to the second element, is permanently monitored by means of a signal unit. Thus, a signal may be outputted to the driver upon existence and/or non-existence of the operating position based on which he realizes whether he views into the desired capture area or not. If the driver identifies due to the signal which is outputted to him that he no longer views the desired capture area or at least does not view the desired capture area completely, he may react correspondingly—either by re-adjusting the capture area or, if this is not possible, by terminating the tour as soon as possible, in order to avoid a risky situation.

By such a holding apparatus, the driver may quickly and reliably identify whether the holding apparatus is in the operating position or not. For instance, the holding apparatus may not be in the operating position after a collision with an obstacle in the vehicle environment or by being displaced by hand by a third party (such as illegally, if the vehicle is parked and unsupervised). Or, the holding apparatus is retracted for parking or for a car-wash plant and, thus, is outside the operating position. Then, the driver reliably realizes (e.g. with starting of the vehicle) by means of a corresponding hint (signal) that the holding apparatus is not in the operating position and can adjust the same, before he drives off.

Preferably, the position of the first element to the second element comprises an operating position in which the image capture unit captures a defined capture area. In addition, it is also conceivable that the position of the first element to the second element comprises a further position, such as a retracted/folded-in position in which the second element is completely retracted and folded-in, respectively, in view of the first element. The determination of further positions of the holding apparatus has the advantage that it is not only possible to monitor whether the operating position is met, but also whether further positions which may be legally prescribed in the road traffic are achieved (such as the retraction of the outside mirror at attachment positions smaller than or equal to two meters above the lane/road surface).

According to a preferred embodiment, the signal device outputs a signal, if the first element and the second element are in the operating position. So, it is shown to the driver without any doubts that the fixedly defined operating position corresponds to the shown and the viewable, respectively, capture area.

Alternatively or additionally, the signal device outputs a signal, if the first element and the second element are not in the operating position, which shows the driver that the holding apparatus is no longer in the operating position and that he has to react immediately.

Preferably, the signal device outputs the signal at a fixedly defined position between the first element and the second element which has at least a fixedly defined movement area between a position of the first element to a position of the second element. A fixedly defined movement area means an area in which the second element may move relatively to the first element without output of a signal or in which a signal is permanently outputted. That is, the fixedly defined movement area is an area which is characterized by two positions of the second element relative to the first element in which the fixedly defined capture area is still shown and, thus, no signal has to be outputted to the driver or the signal to the driver has to be maintained. As soon as the second element, however, exits the fixedly defined movement area, i.e., moves beyond one of the two positions in which the fixedly defined capture area is still shown, a signal is outputted or the signal is no longer outputted. The output of the signal may be performed acoustically (alert), optically (overlay in the monitor or a warning light in the instrument panel), etc. Thus, the fixedly defined movement area does not necessarily comprise the operating area, but may also comprise any other area, e.g. an area for retracting the second element. Alternatively or additionally, it may be possible that the vehicle cannot be moved as long as the holding apparatus is not in the operating position.

According to a preferred embodiment, the signal device is arranged in the first element and the signal transmitter is arranged in the second element. Alternatively, the signal device is arranged in the second element and the signal transmitter is arranged in the first element. The choice where the signal device and the signal transmitter are arranged is dependent on how the signal unit is constructed and where the processing unit is arranged on the holding apparatus, in order to allow a data/information transmission from the signal unit to the processing apparatus which is as simple as possible and, at the same time reliable. So, for instance, it is advantageous to arrange the signal device on the same element of the holding apparatus on which the processing unit is also located and on the first element, respectively, which is fixed as concerns its location to the vehicle such that no mechanical load is applied to the electric connection.

The signal device may be a mechanically operated switch and/or a micro switch. Alternatively, the signal device may be a contactless to be operated sensor, such as a Hall sensor, a read sensor or an optic sensor (e.g. a laser).

The bearing mechanism between the first element and the second element is preferably a rotating mechanism with a rotating axis which extends in the height direction of the vehicle in a state in which it is mounted on the vehicle. In other words, the bearing mechanism may be configured such that it allows a pivot and rotating movement between the first element and the second element, e.g. around a journal. This allows the second element to be retractable relatively to the first element and, thus, that the longitudinal extension of the holding apparatus is reduced compared to the non-retracted outstretched state.

Alternatively, the bearing mechanism may be a sliding mechanism which allows a movement of the second element relative to the first element perpendicular to the longitudinal axis of the vehicle, such as by use of sliders.

The movement of the first element relative to the second element preferably occurs by use of a motor which is arranged either in the holding apparatus itself or in the vehicle and which is controlled by the processing unit of the holding apparatus, the control unit of the vehicle or a separate control unit. Alternatively, a displacement of the second element to the first element may also be performed by hand.

Preferably, the holding apparatus further has an engagement device which has at least one engagement position. The engagement position corresponds to the operating position. The engagement device has teeth (projections and grooves, respectively) at the first element and the second element for a positive locking between the first element and the second element and a spring which presses the second element in the first element. Alternatively to an engagement device, the bearing mechanism may have a friction bearing. The adjustment of the operating position, however, is performed more reliably with an engagement device. Preferably, the bearing mechanism has a predetermined breaking point. So, the holding apparatus may break at the bearing position in a controlled manner in case of a heavy collision with an obstacle in the vehicle environment, i.e., if a mere retracting of the second element is not sufficient, without that the vehicle body is damaged.

Preferably, the signal transmitter has a geometric form by which the signal device is operated. So, a mechanical operation of the signal device occurs what is a reliable form of signal generation.

In this respect, the geometric form preferably has at least one projection in the direction of the rotating axis of the rotating mechanism and is arranged radially around the rotating axis. For instance, the signal transmitter may have the form of a cam or a groove.

In order to save installation space, the geometric form, i.e. the projection or the groove, may be integrated in the engagement device. Alternatively, the geometric form may also be arranged in spatial vicinity to the engagement device.

Alternatively, the signal transmitter may generate a magnetic field or an inductive field by which the signal device is operated. Thereby, a sensitive signal unit is provided by which a very detailed signal may be generated.

Preferably, the holding apparatus further has a processing unit which is configured to process the image data of the image capture unit. Further, the processing unit may also be configured to process the information of the signal device. Further, the processing unit may also be configured to control the signal unit and/or the image capture unit which has the advantage that the number of components which are necessary for the operation of the holding apparatus may be reduced. Alternatively, a further processing unit may also be provided which is configured to process the information of the signal device. An existing control unit (electronic control unit, ECU) of the vehicle, an ECU in the monitor, an ECU in the capture unit or an additional ECU may serve as a processing unit.

The processing unit is arranged in the first element and/or the second element and/or the vehicle.

Preferably, the image capture unit is a camera unit (e.g. with a CMOS and CCD technology) and/or a sensor device, such as a sensor device which detects objects in the vehicle environment by means of ultrasonic, radar, etc.

Preferably, the image capture unit is configured and the first and second element of the holding apparatus are arranged and fixed to the vehicle such that the image capture unit captures at least one legally prescribed field of view in the operation position, such as the fields of view II and IV defined in the UN-regulation ECE R46.

Preferably, the image data captured by the capture unit are reproduced on a reproduction unit. For this, for instance, a reproduction unit (e.g. a monitor) which is arranged inside the vehicle, e.g., in the driver's cabin, left or right at the A-pillar or centric there between, is suitable.

According to a preferred embodiment, the signal device is operated by the signal transmitter at a switching angle which is smaller than a disengagement angle at which the second element exits the operating position. The switching angle is the angle around which the second element is rotated relatively to the first element if the signal device is switched. The switching angle is smaller than the disengagement angle.

In case of a mechanical operation of the signal device by a signal transmitter with a predetermined geometric form this means that the signal device starts to move relatively to the signal transmitter or that the signal transmitter starts to move relatively to the signal device, before the disengagement angle is reached, when the holding apparatus moves out of the operating position (i.e. disengages). Thus, the signal device is already switched prior to reaching the disengagement angle.

On the other side, when the holding apparatus is moved from the non-operating position in the operating position (i.e. engages), the signal device starts to move relatively to the signal transmitter or the signal transmitter starts to relatively move to the signal device prior to reaching the operating position. Thus, the signal device is already switched prior to reaching the operating position.

So, in the operating position and/or the non-operating position, a signal is reliably generated or no signal is generated which reliably indicates to the driver whether the holding apparatus is still in the operation position or not.

A camera monitor system for a vehicle comprises a holding apparatus as described above and a reproduction unit which is arranged inside the vehicle such that it may be viewable by a driver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described with reference to the enclosed figures, in which.

DETAILED DESCRIPTION OF THE PRESENTLY PREFERRED EMBODIMENTS

Figure 1:
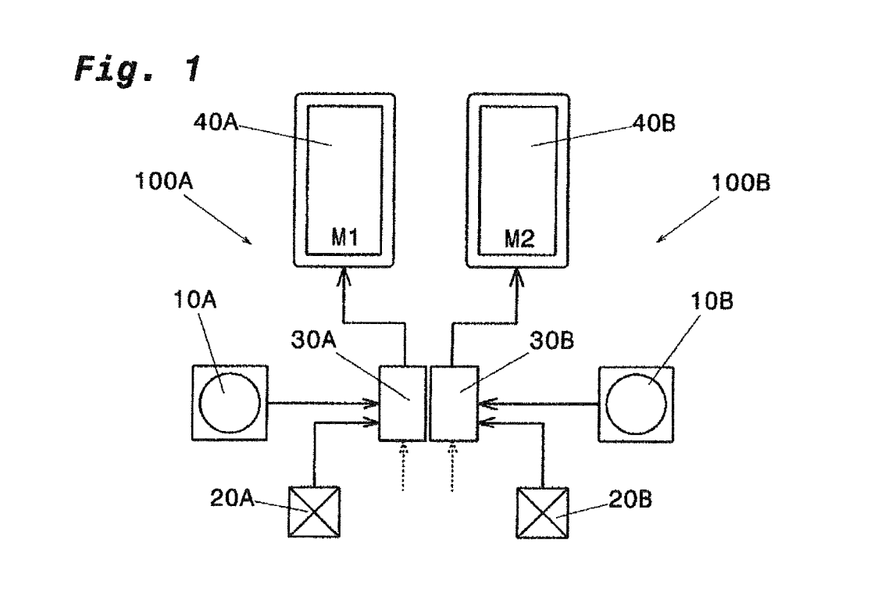
FIG. 1 is a schematic view of two camera monitor systems.

FIG. 1 shows a schematic view of two camera monitor systems 100A, 100B of a vehicle, in particular a commercial vehicle. The camera monitor system 100A may be mounted on the left side of a vehicle body, the camera monitor system 100A may be mounted on a right side of a vehicle body. Each camera monitor system 100A, 100B has an image capture unit 10A, 10B, a signal unit 20A, 20B, a processing unit 30A, 30B and a reproduction unit 40A, 40B. The image capture unit 10A, 10B is configured to capture image data of an environment around the vehicle on either a left or a right side and to supply these image data to the respective processing unit 30A, 30B. The signal unit 20A, 20B is configured to generate signals and to supply these signals to the respective processing unit 30A, 30B. It is conceivable to connect further assemblies to the processing unit 30A, 30B which supply further input parameters to the respective processing unit 30A, 30B (see dashed arrow in FIG. 1). The processing unit 30A, 30B controls the image capture unit 10A, 10B and the signal unit 20A, 20B and processes the image data and information, respectively, supplied by the image capture unit 10A, 10B and the signal unit 20A, 20B and supplies the processed image data and information, respectively, to the reproduction unit 40A, 40B (e.g. a monitor). The processing unit 30A, 30B is presently an electronic control unit (ECU) which is provided in addition to the ECU which is provided in the vehicle.

Figures 2A, 2B:
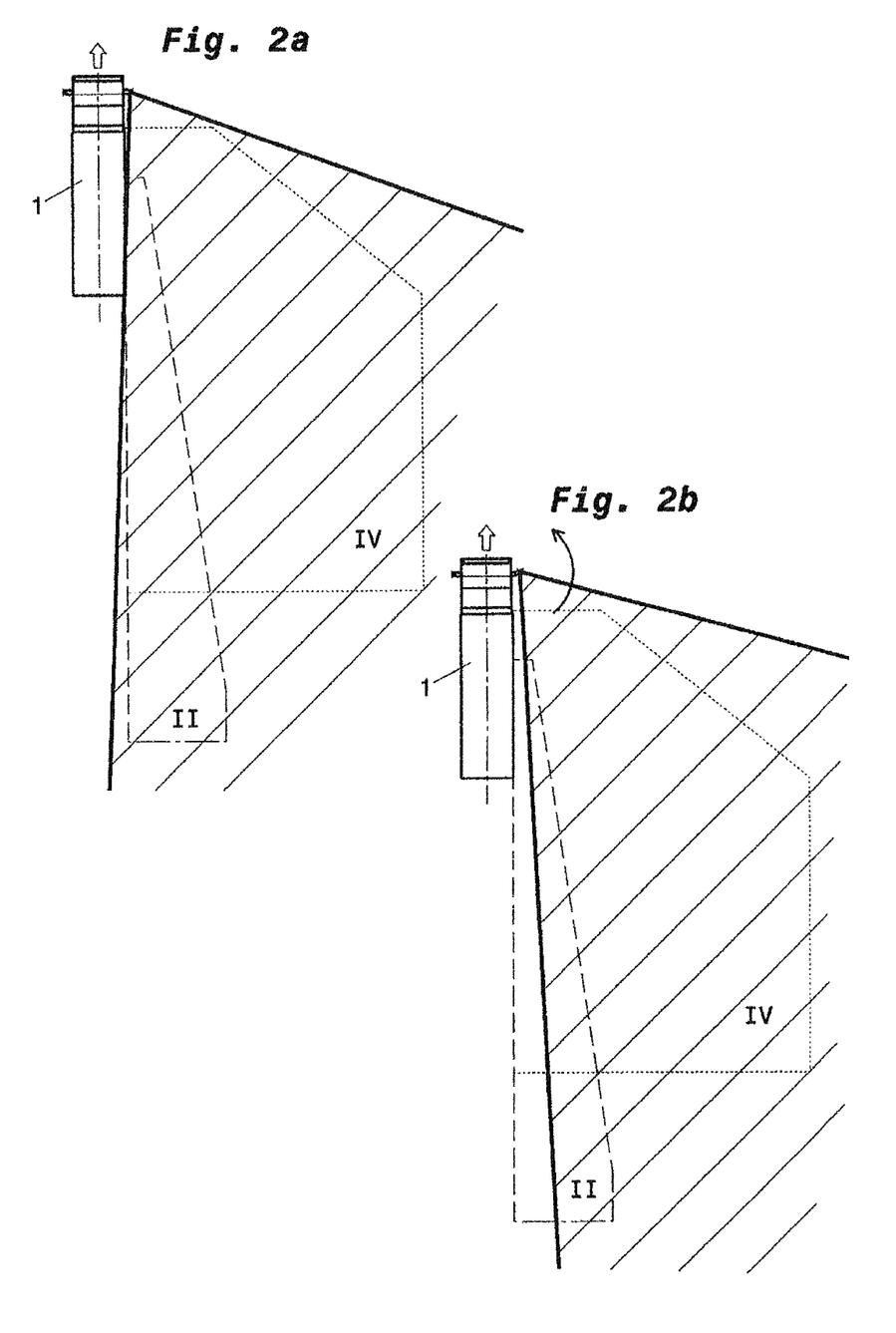
FIG. 2a is a plan view of a vehicle whose device for indirect view is in an operating position.
FIG. 2b is a plan view of a vehicle whose device for indirect view is partially outside the operating position.

FIGS. 2a and 2b are plan views of a vehicle 1. Presently, the vehicle 1 is a commercial vehicle, in particular a truck, which provides straight forward driving (see arrow at driver's cabin). The vehicle 1 has a device for indirect view at the left and right outer wall of the driver's cabin. The device for indirect view captures an area of view (hatched in FIGS. 2a and 2b) which comprises two legally prescribed fields of view, the field of view II of a main mirror and the field of view IV of a wide angle mirror, as defined in the ECE R46. In FIG. 2a, the device for indirect view is adjusted such that it captures the fields of view II and IV completely and that the driver can correspondingly completely view the fields of view II and IV. Thus, the device for indirect view is in the operating position. In FIG. 2b, the device for indirect view is displaced in view of the operating position such that the device for indirect view merely shows the fields of view II and IV. Thus, the device for indirect view is no longer in the operating position.

Figures 3A, 3B:
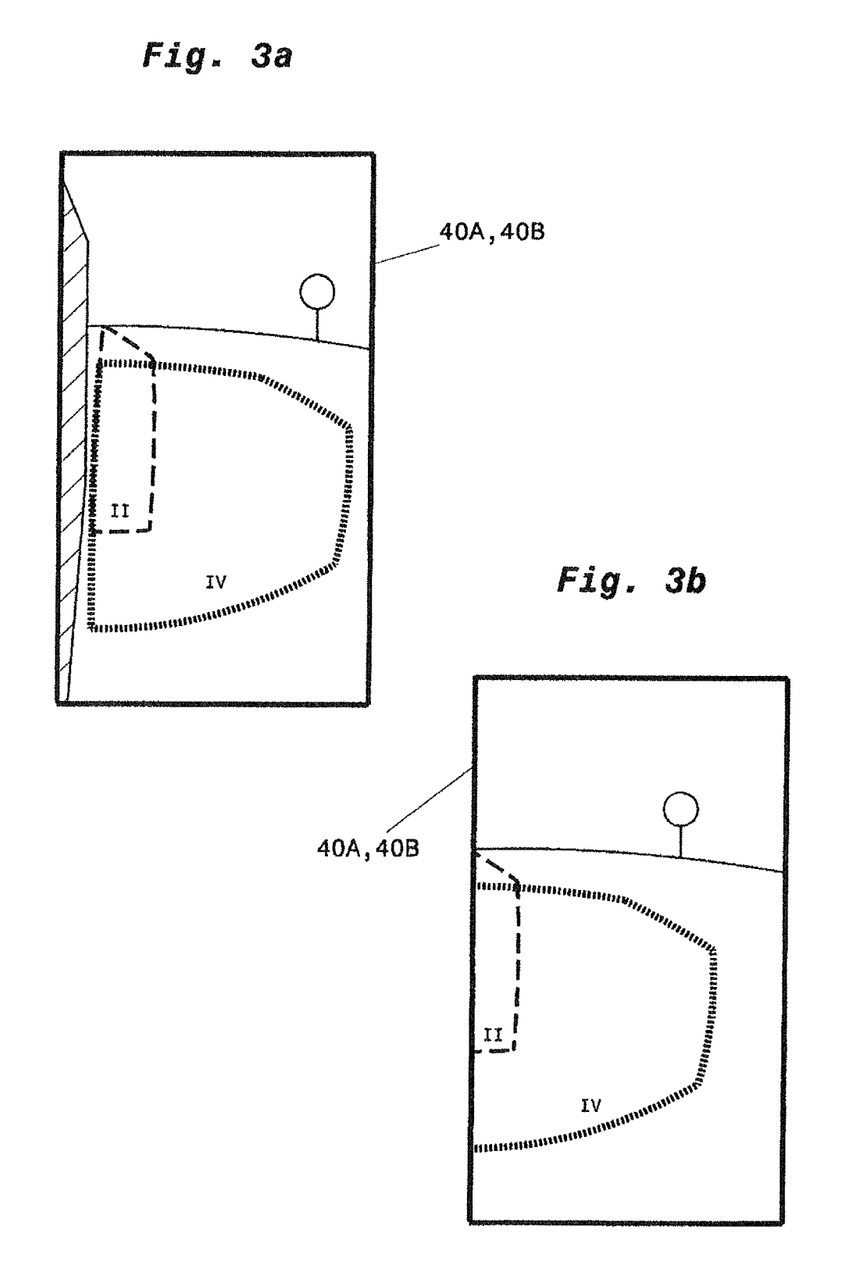
FIG. 3a is a view of a device for indirect view which is in the operating position.
FIG. 3b is a view of a device for indirect view which is partially outside the operating position.

In FIGS. 3a and 3b, the views of a vehicle environment which show the device for indirect view in accordance with the positions of the device for indirect view of FIGS. 2a and 2b, are shown. Presently, the views of the vehicle environment are depicted on the reproduction units 40A, 40B. As it can be taken from FIG. 3a, the fields of view II and IV as well as a part of the vehicle side wall can be seen on the reproduction unit 40A, 40B. Thus, the position of the image capture unit corresponds to the operating position. Whereas, FIG. 3b incompletely shows the fields of view II and IV and no vehicle side wall on the reproduction unit 40A, 40B. Thus, the position of the image capture unit does not correspond to the operating position.

Figure 4:
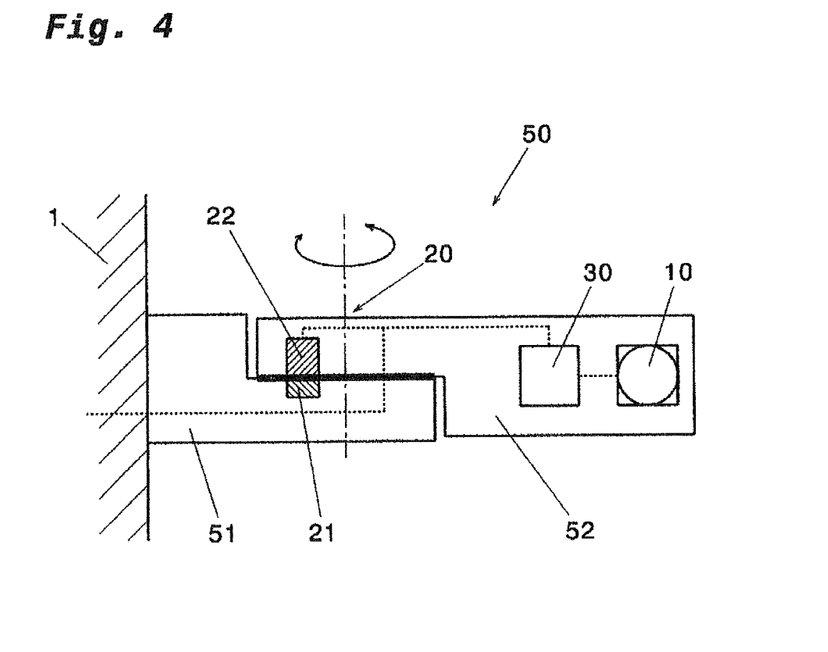
FIG. 4 is a schematic view of a holding apparatus according to the invention.

FIG. 4 schematically shows a side view of a holding apparatus 50 according to the invention. The holding apparatus 50 presently corresponds to an elongated camera arm which projects from the body of the vehicle 1, preferably on a left and right outer side of the driver's cabin, respectively. The holding apparatus 50 has a first element 51 and a second element 52. The first element 51 is fixedly and rigidly, respectively, attached to the outer wall of the vehicle 1. The first element 51 has a stepped shape. The second element 52 has a shape which is oppositely stepped to the stepped shape of the first element 51 and is hingely connected to the first element 51. The second element 52 has the image capture unit 10 and the processing apparatus 30. Further, the holding apparatus 50 has a signal unit 20. The signal unit 20 consists of a signal transmitter 21 and a signal device 22. The signal transmitter 21 is arranged on the first element 51, whereas the signal device 22 is arranged on the second element 52. The holding apparatus 50 shown in FIG. 4 has a rotating mechanism (see arrow in FIG. 4). That is, the second element 52 is relatively rotatable supported to the first element 51. The signal transmitter 21 and the signal device 22 are aligned to each other in the direction of the rotating axis of the rotating mechanism. The conductive traces for supplying the image data of the image capture unit 10 and the information of the signal unit 20 pass through a rotary feedthrough (not shown) from the second element 52 to the first element 51.

Figure 5:
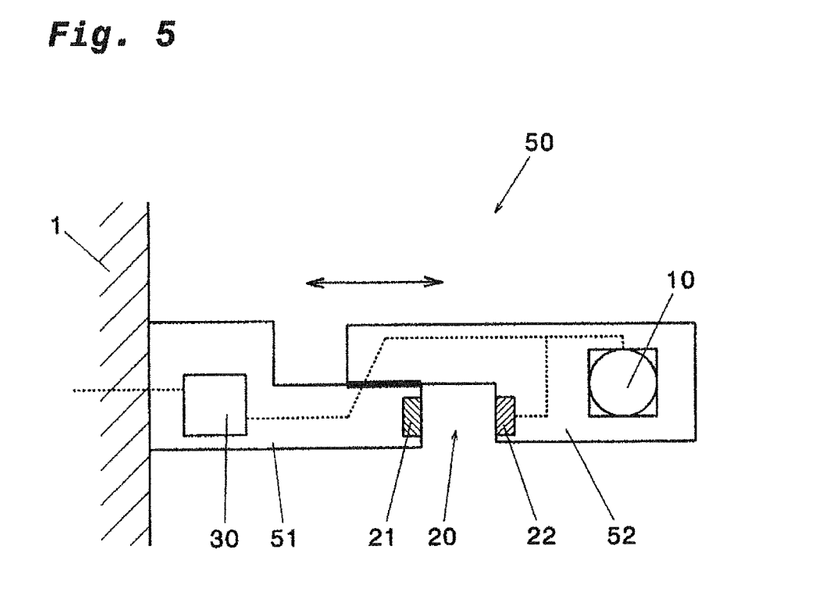
FIG. 5 shows a further embodiment of a holding apparatus according to the invention.

FIG. 5 shows an alternative embodiment of a holding apparatus 50 according to the invention. The holding apparatus shown in FIG. 5 differs from the holding apparatus shown in FIG. 4 in that it has no rotating mechanism, but a sliding mechanism. That is, the second element 52 is configured displacably, slidably with respect to the first element 51 (see arrow in FIG. 5). With the holding apparatus 50 shown in FIG. 5, the image capture unit 10 is located on the second element 52, whereas the processing unit 30 is located on the first element 51. The signal transmitter 21 and the signal device 22 are aligned to each other in the sliding direction of the sliding mechanism.

The signal unit 22 and the signal transmitter 21 in FIGS. 4 and 5 may each be arranged either on the fixed first element 51 or the moveable second element 52 of the holding apparatus 50.

Figure 6:
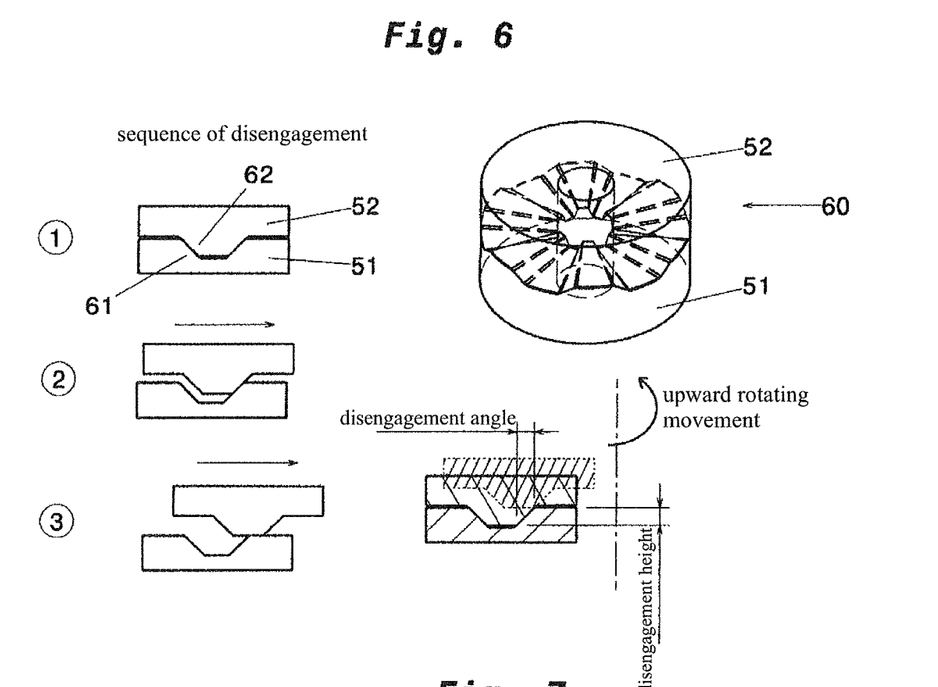
FIG. 6 shows a perspective view as well as sectional views of an engagement apparatus in different positions.

FIG. 6 shows an engagement device 60 as it is provided in a holding apparatus 50 with a rotating mechanism. The engagement device 60 consists of a first notch 61 which is provided at the first element 51, and a second notch 62 which is provided at the second element 52. The first and second notches 61, 62, respectively, have at least one recess and one projection, respectively, in the respective first or second element 51, 52 which are configured such that their shapes correspond to each other and such that they form a positive locking if they engage each other. In the present case, the notches 61, 62 have multiple teeth which have the shape of a flattened triangle with horizontally disposed surfaces which are adjacent to both sides thereof. In this respect, the first notch 61 has multiple recesses which are provided in the first element 51 and each of which has two obliquely disposed surfaces which are opposite to each other and which extend to a horizontal surface such that the cross section of the respective recess decreases continuously up to the reaching of the horizontal surface. The second notch 62, however, has multiple projections which project from the second element 52 and each of which has two obliquely disposed surfaces which are opposite to each other and which extend away from a horizontal surface such that the cross section of the projection increases continuously from the horizontal surface. As shown in the perspective view in FIG. 6, multiple recesses/projections (teeth) may be radially arranged around the rotating axis of the rotating mechanism, which, then, correspond to the different operating and non-operating positions.

In steps 1 to 3 in FIG. 6, the disengaging of the second element 52 from the first element 51 is shown. In step 1, the two elements 51, 52 are in an engaged state by means of positively locked engagement of notches 61, 62. A spring (not shown) presses the second notch 62 of the second element 52 in the first notch 61 of the first element 51. In step 2, the first element 51 is moved relatively to the second element 52, such as being linearly displaced or rotated (see arrow to the right in FIG. 6). Thereby, the positively locked connection between the first element 51 and the second element 52 is released. Such a rotation and displacement, respectively, may be performed by a motor which is provided in the vehicle or the holding apparatus, however is commonly performed mechanically, such as per hand, e.g. by the vehicle driver. As long as the force which is required for moving the second element 52 in view of the first element 51 falls below the spring force, which presses the second notch 62 in the first notch 61, no complete disengagement of the second element 52 from the first element 51 occurs, but only a movement of the second notch 62 along the oblique surface of the first notch 61, without leaving the oblique surface of the first notch 61 and without moving beyond the oblique surface of the first notch 61, respectively. In other words, the second element 52 will move again in the first notch 61 of the first element 51, as soon as the motor no longer moves the two elements 51 and 52 not relatively to each other. In step 3, finally, the force applied from the motor on the second element 52 exceeds the spring force which presses the second element 52 downward in the first notch 61. Thus, the second notch 62 moves beyond the oblique surface of the first notch 61 and exits the same. This process is called disengagement.

In FIG. 6, further, a sectional view of the first element 51 and the second element 52 is depicted by means of which the terms "disengagement angle" and "disengagement height" are defined. The disengagement angle is the angle around which the second element 52 is rotated in view of the first element 51 such that the second element 52 disengages from the first element 51. Once the disengagement angle is reached, the force which is applied by the motor on the second element 52 exceeds the spring force which presses the second element 52 downward in the first notch 61 and the second element 52 disengages from the first element 51. The distance which is covered from the second element 52 during disengagement relatively to the first element 51 perpendicular to the movement direction is called the disengagement height, i.e., the height which is required such that the horizontal part of the second notch 62 of the second element 52 moves along the oblique surface of the first notch 61 of the first element 51 such that it just leaves the oblique surface of the first notch 61.

Figure 7:
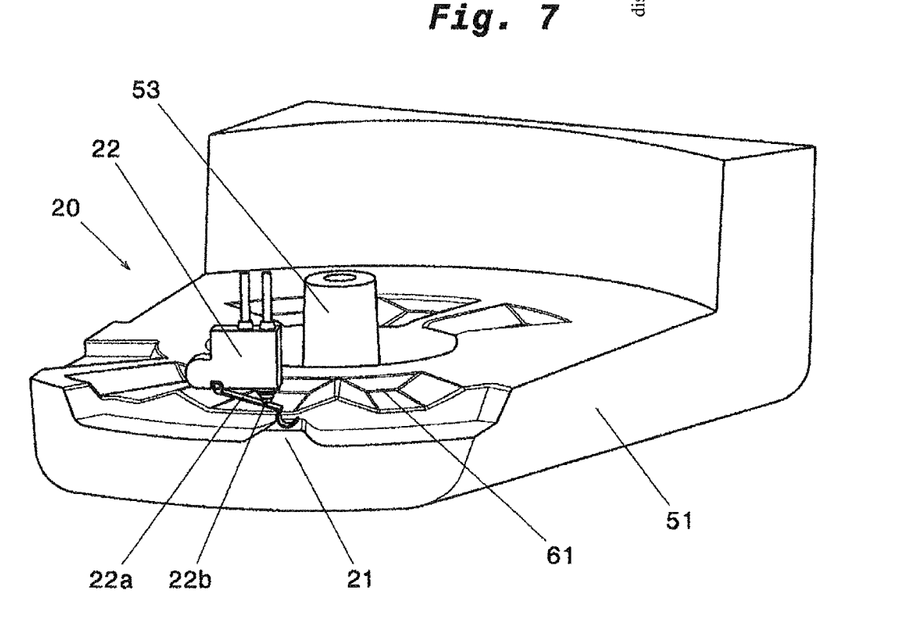
FIG. 7 shows a perspective view of a first element of the holding apparatus according to the invention of FIG. 4 with a signal device in the operating position.
Figure 8:
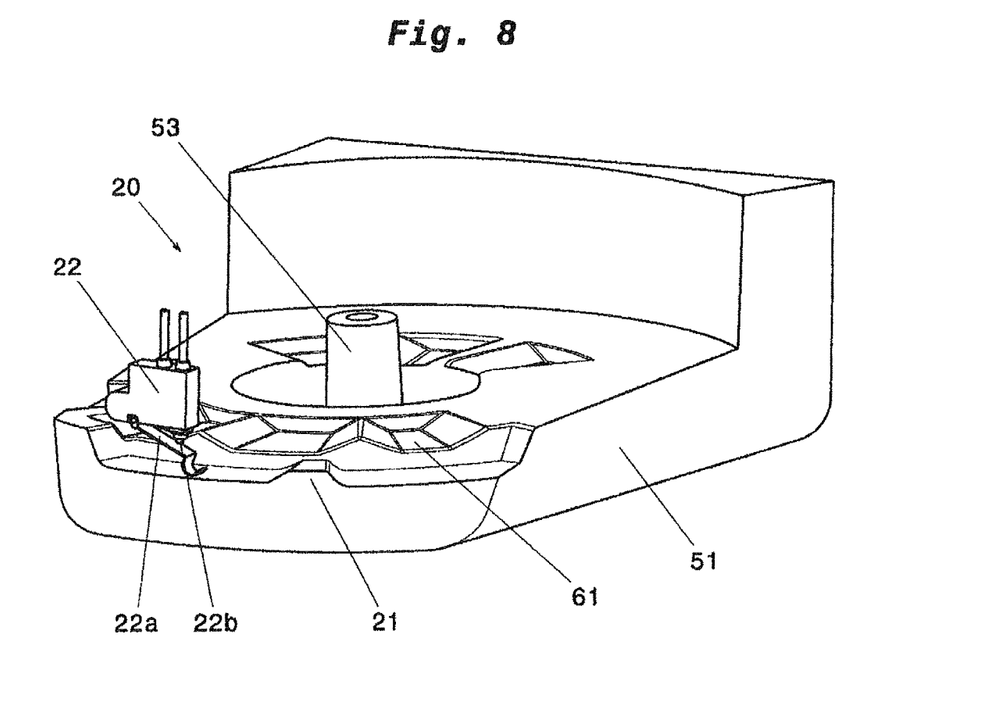
FIG. 8 shows a perspective view of a first element of the holding apparatus according to the invention of FIG. 4 with a signal device outside the operating position.

In FIG. 7, a perspective view of a first element 51 of the holding apparatus 50 according to the invention of FIG. 4 is shown with a signal unit 20 in operating position. The signal unit 20 has the signal device 22 and the signal transmitter 21. The signal device 22 has a mechanical switch 22b which is operated via an elastic arm 22a. The signal transmitter 21 is configured in the shape of a projection, e.g. a cam, which is arranged on a section of the first element 51 around a rotating axis 53 of the holding apparatus 50. The signal transmitter 21 is located on the first element 51 and the signal device 22 is located at the second element 52. If the elastic arm 22a of the signal device 22 is located on the cam, i.e. the signal device 21, the elastic arm 22a presses the switch 22b of the signal device 22 and, thus, operates the signal device 22. In FIG. 8, the operating situation is shown in which the elastic arm 22a of the signal device 22 is not located on the cam, i.e. the signal transmitter 21, and, thus, does not press the switch 22b of the signal device 22. Correspondingly, the signal transmitter 21 does not operate the signal device 22 during the operating situation shown in FIG. 8.

In FIGS. 7 and 8, further, the part of the engagement apparatus 60 which is arranged in the first element 51 is shown. By means of the engagement apparatus 60, it is possible to set an exact operating position of the first element 51 relatively to the second element 52. Presently, the position of the first element 51 to the second element 52 which completely shows a predetermined capture area of a capture unit, such as a camera, preferably with a CMOS or a CCD technology, is called the operating position. Such a capture area may be one or more areas defined by the vehicle driver, but may also be one or more legally prescribed fields of view, such as the fields of view II and IV of the ECE R46. Alternatively, the operating position may also be defined by a friction bearing. The signal transmitter 21, i.e. the cam, is arranged at the engagement apparatus 60 such that the signal transmitter 21, as shown in FIG. 7, operates the switch 22b of the signal device 22 by pressing, as long as the holding apparatus 50 is in the operating position. However, as soon as the operating position is exited by a movement of the second element 52 relative to the first element 51, the signal device 22 moves away from the signal transmitter 21, i.e. the elastic arm 22a of the signal device 22 exits the cam. Thereby, the elastic arm 22a of the signal device 22 moves downward along the cam in FIG. 8 and moves away from the switch 22b of the signal device 22 such that it does no longer contact the switch 22b of the signal device 22. Thereby, the signal transmitter 21 does no longer operate the signal device 22. As soon as the signal device 22 is no longer operated and, correspondingly, does also not supply any signal to the processing unit 30, the processing unit 30 outputs the information to the reproduction unit 40A, 40B that the holding apparatus 50 has exited the operating position. On the other side, the processing unit 30 does not output any information to the reproduction unit 40A, 40B, if the holding apparatus 50 is in the operating position or outputs an information to the reproduction unit 40A, 40B that the holding apparatus 50 is in the operating position. The information of the processing unit 30 may be indicated to a driver acoustically by an alert, optically by superimposition on the reproduction unit, etc. Alternatively, the signal device 22 may also be configured such that the signal device 22 is not operated with contact of the signal transmitter 21 with the arm 22a and the signal device 22 is operated with exiting of the signal transmitter 21.

In order to compensate tolerances of the components which are associated with the signal generation and transmission, i.e. the signal transmitter 21 and the signal device 22, such as a play in the switch 22b of the signal device 22, distortion of surfaces of the signal transmitter 21, etc., the operation of the signal device 22 preferably is performed prior to reaching the disengagement angle $\beta_1$, i.e. the angle around which the second element 52 is to be rotated in view of the first element 51 such that the second element 52 just disengages from the first element 51. The switching of the signal device prior to reaching the disengagement angle compensates tolerances in the signal transmitter (such as a surface/manufacturing distortion of the cam) and/or in the signal device (such as a tolerance in the switch 22b or the arm 22a) and, thus, of a tolerance chain (chain linking of single tolerances) such that the signal device 22 reliably switches with reaching the disengagement angle $\beta_1$. In other words, if the switching device 22 would not be operated prior to reaching the disengagement angle $\beta_1$, it would be shown to the vehicle driver in a delayed, i.e. too late, manner due to tolerances that the holding apparatus 50 is no longer in the operating position.

Figure 9:
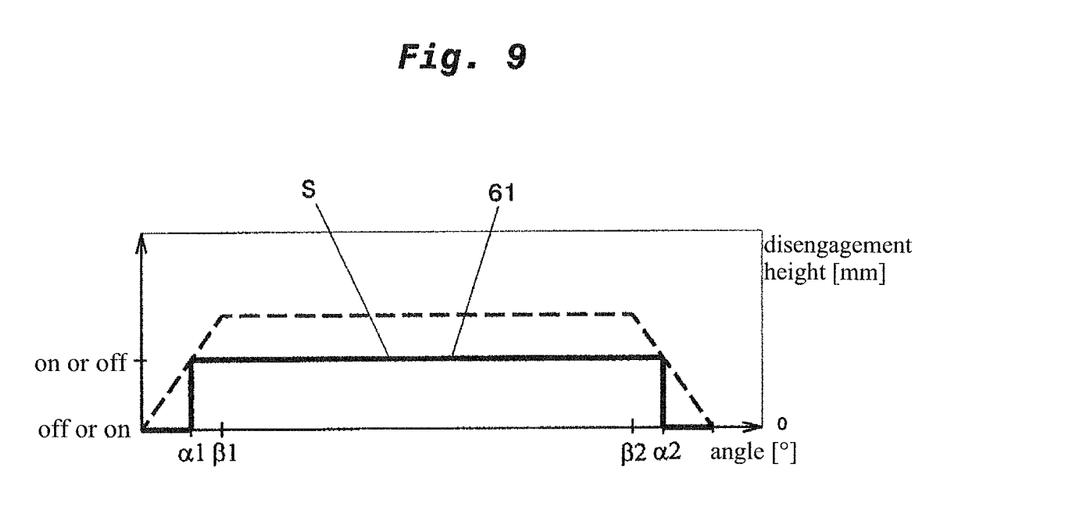
FIG. 9 is a diagram which schematically shows a superposition of a disengagement movement of a second element of the holding apparatus according to the invention and a signal path of a signal device.

In FIG. 9, a diagram is shown which shows a schematic superimposition of the operating signal S (thick black line) which is outputted from the signal transmitter 21 to the signal device 22 and the disengagement movement of the second element 52 from the first element 51 (see dashed line). On the horizontal axis, the angle is indicated around which the second element 52 is rotated in view of the first element 51. On the perpendicular axis, the distance (height) is indicated which is covered by the second element 52 during the disengagement process. As it can be taken from FIG. 9, the disengagement movement of the second element 52 from the first element 51 corresponds substantially to the form of the first notch 61: With increasing rotating angle, the second element 52 moves along an oblique straight line upward as long as the disengagement angle $\beta_1$ is reached, i.e. the rotating angle at which the second element 52 has reached the upper end of the oblique surface of the second notch 62. If the second element 52 is now further rotated with respect to the first element 51, the second element 52 does not move further upward away from the first element 51, but runs along a horizontally disposed surface till a further disengagement angle $\beta_2$ is reached after reaching a certain rotating angle at which the second element 52 moves along an obliquely downward disposed surface and, thus, re-engages the first element 51 (end position).

The course of the operating signal which is outputted from the signal transmitter 21 to the signal device 22, however, follows a step function. If the holding apparatus 50 is configured such that the signal transmitter 21 operates the signal device 22 not until leaving/exiting the operating position such that the signal device 22 outputs a signal to the vehicle driver not till then, firstly, no operation of the signal device 22 occurs with rotating the second element 52 in view of the first element 51 by the signal transmitter 21 (see term "on or off" at 0 mm disengagement height in FIG. 9). However, as soon as the rotating angle has reached a certain amount, namely a switching angle $\alpha_1$, which lies between the operating position at the beginning of the rotating movement (0°) and the disengagement angle $\beta_1$, the signal transmitter 21 operates the signal device 22 (see term "on or off" at x mm disengagement height in FIG. 9) such that the signal device 22 can output a signal to the processing device 30. In other words—referring to FIG. 8—only the arm 22a moves downward the chute of the cam (signal transmitter 21) between a rotating angle of 0° to $\alpha_1$. With reaching the switching angle $\alpha_1$, the arm 22a of the signal device 22 has completely run the chute of the cam downwards and moves further horizontally. Thereby, the switch 22b starts to switch the signal device 22 at the switching angle $\alpha_1$ such that it outputs a signal for showing that the operating position has been left/exited (or outputs no signal, if the signal device is constructed such that it outputs a signal in the operating position). At an engagement angle $\beta_2$, the arm 22a of the signal device 22 starts to move in the end position, i.e., to run the chute at the end position again upward. As soon as the angle $\alpha_2$ is reached, the signal device 22 is operated by the signal transmitter (a further cam) such that it outputs a signal that the end position is reached. The end position is defined in that a further rotating of the second element 52 relative to the first element 51 is hindered by a mechanic stopper (not shown).

By means of a signal output before reaching the disengagement angle $\beta_1$, tolerances relating to the signal generation and signal transmission components, such as the signal transmitter 21 and the signal device 22, may be compensated. In other words, in this manner, it is ensured that even of tolerance associated delays in the signal generation and transmission an exiting of the operation position between the first element 51 and the second element 52 surely and reliably are detected at reaching the disengagement angle $\beta_1$ and are correspondingly shown to the vehicle driver. If the disengagement angle $\beta_1$, for instance, is around 6° (that is 6.2°, 6.5°, etc.), the signal generation and transmission may already start at a switching angle $\alpha_1$ of around 3° (that is 3.2°, 3.5°, etc). On the other side, if the holding apparatus is moved from the non-operating position, the signal device 22 is switched after passing the disengagement angle $\beta_2$, but prior reaching the operating position, at a second switching angle $\alpha_2$. In this manner it can be ensured that the processing unit 30 reliably shows the reaching of the disengagement angle and the engagement angle $\beta_2$, respectively, that is, the exiting of the operating position and the entering of the end position, respectively, by a corresponding signal output (or a non-signal output) to the vehicle driver.

It is also possible that there are multiple engagement positions/postures between the operating position and the end position. The different engagement positions may correspond to different positions of the second element 52 relative to the first element 51 required for the driving operation/non-driving operation. The signal device 22 may be configured such that it can detect and differentiate the different engagement positions (e.g. by different geometric shapes of the cam which press the switch 22a different far in the signal device 22).

Figure 10:
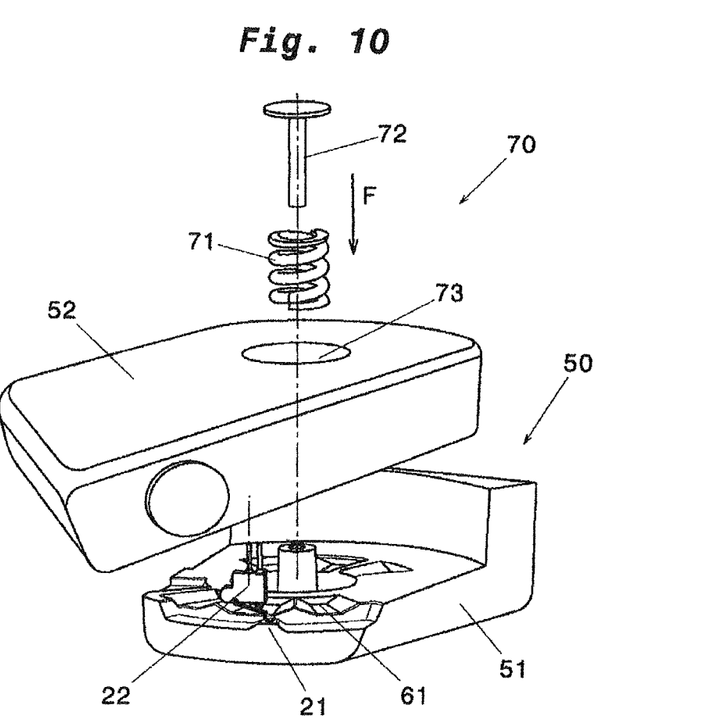
FIG. 10 shows a perspective view of a first element and a second element of the holding apparatus according to the invention of FIG. 4 with a signal device in an operating position.

In FIG. 10, finally, a perspective section of the holding apparatus 50 is shown in which the spring 71 mentioned with respect to FIG. 6 is shown. In the assembled state, the spring 71 is located in a spring seat 73 and is fixed thereto by means of a spring fixing means 72 such as a splint, bolt, etc. The spring 71, the spring fixing means 72 and the spring seat 73 form together a spring device 70. The spring 71 presses the first element 51 such onto the second element 52 by means of the spring force F (see arrow downward) that the second notch 62 engages the first notch 61. If the second element 52 is rotated in view of the first element 51 such that the spring force of the spring 71 is exceeded, the second element 52 reaches the so called disengagement angle and the second notch 62 exits the first notch 61. If the rotation of the first element relative to the second element, however, is between 0° and $\beta_1$ and is the rotating movement not continued until reaching $\beta_1$, the spring 71 presses the second element 52 back in the first element 51, i.e. in the operating position.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A holding apparatus for a vehicle; comprising:
    a first element which is attachable to the vehicle;
    a second element which is movably connected to the first element via a bearing mechanism;
    an image capture unit which is attached to the second element and which is configured to capture a capture area around the vehicle, wherein the image capture unit is a camera device and/or a sensor device; and
    a signal unit which is configured to detect the position of the first element relatively to the second element;
    wherein the signal unit comprises:
        a signal device which is configured to output a signal (S), and
        a signal transmitter which is configured to operate the signal device dependent on a position of the first element to the second element such that it outputs the signal (S),
    wherein the position of the first element to the second element comprises an operating position in which the image capture unit captures a defined capture area such that the vehicle driver can identify, whether to view the defined capture area, and
    wherein the signal device is arranged in the first element and the signal transmitter is arranged in the second element.

2. The holding apparatus of claim 1, wherein the signal device outputs the signal (S) if the first element and the second element are in the operating position.

3. The holding apparatus of claim 1, wherein the signal device outputs the signal (S) if the first element and the second element are not in the operating position.

4. The holding apparatus of claim 3, wherein the signal device outputs the signal (S) at a fixedly defined position between the first element and the second element which has at least a defined movement area between a position of the first element to a position of the second element.

5. The holding apparatus of claim 1, wherein the signal device is a mechanically operated switch and a micro switch.

6. The holding apparatus of claim 1, wherein the signal device is a contactless sensor.

7. The holding apparatus of claim 1, wherein the bearing mechanism is a rotating mechanism with a rotating axis which extends in the height direction of the vehicle in a state in which it is mounted on the vehicle.

8. The holding apparatus of claim 1, wherein the bearing mechanism is a sliding mechanism.

9. The holding apparatus of claim 1, further comprising an engagement device which comprises at least one engagement position.

10. The holding apparatus of claim 1, wherein the signal transmitter generates a magnetic field or an inductive field by which the signal device is operated.

11. The holding apparatus of claim 1, further comprising a processing unit which is configured to process the image data of the image capture unit.

12. The holding apparatus of claim 11, wherein the processing unit is further configured to process the information of the signal device.

13. The holding apparatus of claim 11, wherein the processing unit is configured to control the image capture unit and/or the signal device.

14. The holding apparatus of claim 11, wherein the processing unit is arranged in the first element and/or the second element and/or the vehicle.

15. The holding apparatus of claim 1, wherein the image capture unit is configured to capture at least one legally prescribed field of view.

16. The holding apparatus of claim 1, wherein the image data captured by the image capture unit are reproduced on a reproduction unit.

17. The holding apparatus of claim 1, wherein the signal device is operated by the signal transmitter at a switching angle ($\alpha_1$, $\alpha_2$) which is an angle around which the second element is rotated relatively to the first element, if the signal device is switched and which is smaller than a disengagement angle ($\beta_1$, $\beta_2$) at which the second element exits the operating position.

18. A holding apparatus for a vehicle; comprising:
    a first element which is attachable to the vehicle;
    a second element which is movably connected to the first element via a bearing mechanism;
    an image capture unit which is attached to the second element and which is configured to capture a capture area around the vehicle, wherein the image capture unit is a camera device and/or a sensor device; and
    a signal unit which is configured to detect the position of the first element relatively to the second element;
    wherein the signal unit comprises:
        a signal device which is configured to output a signal (S), and
        a signal transmitter which is configured to operate the signal device dependent on a position of the first element to the second element such that it outputs the signal (S),
    wherein the position of the first element to the second element comprises an operating position in which the image capture unit captures a defined capture area such that the vehicle driver can identify, whether to view the defined capture area, and wherein the signal device is arranged in the second element and the signal transmitter is arranged in the first element.

19. A holding apparatus for a vehicle; comprising:
a first element which is attachable to the vehicle;
a second element which is movably connected to the first element via a bearing mechanism;
an image capture unit which is attached to the second element and which is configured to capture a capture area around the vehicle, wherein the image capture unit is a camera device and/or a sensor device; and
a signal unit which is configured to detect the position of the first element relatively to the second element;
wherein the signal unit comprises:
  a signal device which is configured to output a signal (S), and
  a signal transmitter which is configured to operate the signal device dependent on a position of the first element to the second element such that it outputs the signal (S),
wherein the position of the first element to the second element comprises an operating position in which the image capture unit captures a defined capture area such that the vehicle driver can identify, whether to view the defined capture area,
wherein the bearing mechanism is a rotating mechanism with a rotating axis which extends in the height direction of the vehicle in a state in which it is mounted on the vehicle, and
wherein the signal transmitter has a geometric shape by which the signal device is operated.

20. The holding apparatus of claim 19, wherein the geometric shape has at least one projection in the direction of the rotating axis of the rotating mechanism and is arranged radially around the rotating axis.

21. The holding apparatus of claim 19, further comprising an engagement device which comprises at least one engagement position, wherein the geometric shape is integrated in the engagement device.

22. A camera monitor system for a vehicle; comprising:
a holding apparatus according to claim 1; and
a reproduction unit which is attached inside the vehicle such that it is viewable by a driver of the vehicle.

* * * * *